United States Patent

Yano et al.

Patent Number: 5,089,826
Date of Patent: Feb. 18, 1992

[54] NAVIGATION SYSTEM FOR MOVABLE BODY

[75] Inventors: Haruto Yano; Yoshiaki Hirasa; Toshimichi Tokunaga, all of Hiroshima; Norihiro Naito, Hyogo; Kazuhiro Yokouchi, Hyogo; Osamu Shimizu, Hyogo, all of Japan

[73] Assignee: Mitsubishi Denki Kabushiki Kaisha, Tokyo, Japan

[21] Appl. No.: 601,122

[22] Filed: Oct. 22, 1990

[30] Foreign Application Priority Data

Oct. 24, 1989 [JP] Japan ................ 1-277545

[51] Int. Cl.⁵ .............................. G01S 3/02
[52] U.S. Cl. ........................ 342/457; 364/449; 340/995
[58] Field of Search ............... 342/457, 357; 364/449; 340/995

[56] References Cited

U.S. PATENT DOCUMENTS 4,924,402  5/1990  Ando et al. .................. 364/449

Primary Examiner—Theodore M. Blum

[57] ABSTRACT

A navigation system for a movable body wherein a map to be displayed on a screen can be selected freely in accordance with a request of an operator and, when an initial map displayed is restored, the operator can find out a current position of the movable body readily. The navigation system comprises a memory in which map data are stored, a position detector for detecting a current position of the movable body, and a display unit having a screen on which a map based on part of the map data and a current position mark based on a current position from the position detector are normally displayed on the screen. When an operator wants to see an adjacent portion contiguous to the map displayed, one of four scroll key patterns displayed on the screen is selectively touched to cause the map and current position mark on the screen to be scrolled. If a map returning pattern displayed on the screen is touched, the initial map is restored and the current position mark is displayed in position on the map. If the current position mark is out of position then, a correction pattern on the screen is touched to cause the current position mark to be displayed in position on the map.

1 Claim, 7 Drawing Sheets

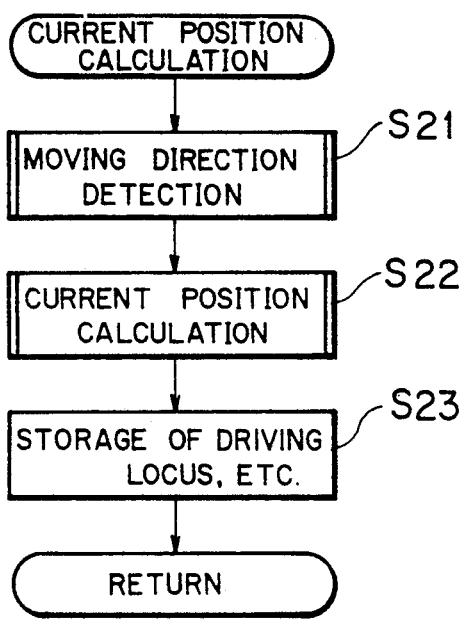
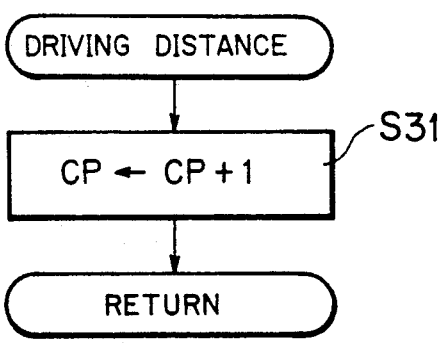
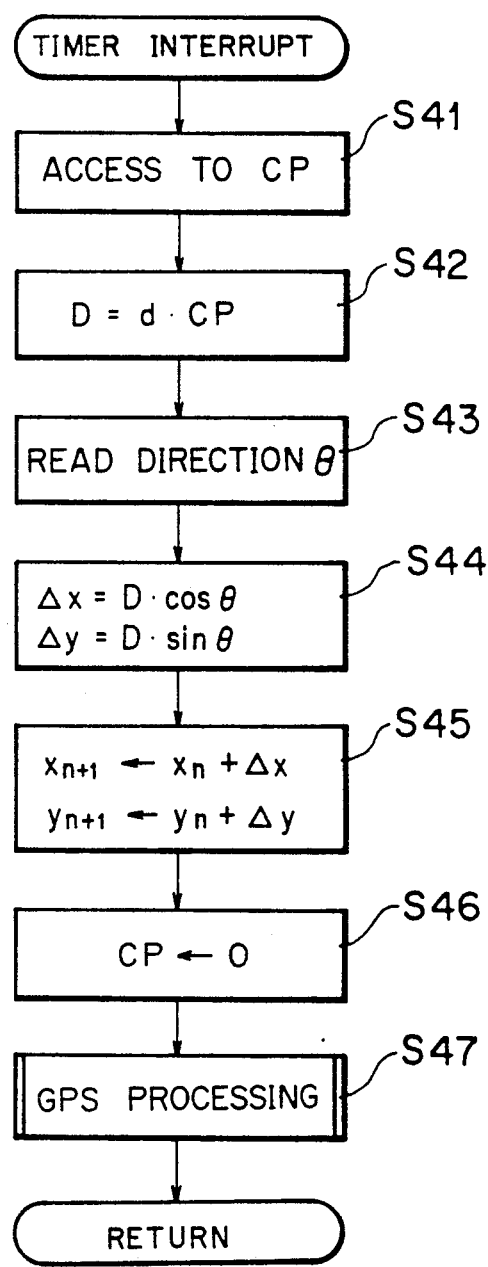

NAVIGATION SYSTEM FOR MOVABLE BODY

BACKGROUND OF THE INVENTION

1. Field of the Invention

This invention relates to a navigation system installed in a movable body such as an automobile, and more particularly to a navigation system for a movable body wherein a map as well as a current position, a locus of movement and so forth of an automobile are displayed on a display unit such as a cathode ray tube to provide driving information to a driver.

2. Description of the Prior Art

A navigation system installed in a movable body such as an automobile is generally constituted such that a map of the whole of a country or a plurality of divided regional maps are stored as map information in map storage means and such map information is read out in accordance with a demand of an operator and displayed on a display unit such as a cathode ray tube to provide a map for the driving to the operator.

Further, a current position of a vehicle is found out by a calculation based detection signals from a distance sensor for detecting a travel distance of the vehicle and a direction sensor for detecting a driving direction of the vehicle, and a triangle mark indicative of the current position of the vehicle and a plurality of serial dots indicative of a driving locus are displayed on a map displayed on the display unit so that the position of the vehicle on the map on the screen may be visually discerned. Such navigation system is disclosed, for example, in Japanese Patent Laid-Open No. 53711/1983 and Japanese Patent Publication No. 39800/1984. Another navigation is also known and disclosed, for example, in Japanese Patent Laid-Open No. 165511/1985 which includes means for retrieving presence or absence of another particular map or means (a scroll key) for changing over a map displayed on a screen to another particular map related to such displayed map.

With the conventional systems described above, after driving of a vehicle is started, a road map indicating a current position of the vehicle is retrieved and displayed on the screen. Then, if it is intended to change over the displayed map, an operator will depress one of cursor keys, and in response to the cursor key, another map contiguous to the displayed map of the current position is retrieved. Thus, the next map contiguous to the displayed map in a direction designated by operation of the cursor key is loaded and displayed on the screen.

However, with a system of the type described above, while a map an operator wants to see can be displayed in response to a request by the operator, when the map displayed is changed over, a mark indicative of a current position of a vehicle in which the system is installed is moved together with the map. Accordingly, there is the possibility that, when the initial map is restored, the operator may lose sight of the position of the vehicle and may not grasp the current position on the map. Consequently, when the operator is driving an unknown or unfamiliar location, its way may be lost.

SUMMARY OF THE INVENTION

It is an object of the present invention to provide a navigation system for a movable body wherein a map to be displayed on a screen can be selected freely in accordance with a request of an operator and, when an initial map displayed is restored, the operator can find out a current position of the movable body readily.

In order to attain the object, according to the present invention, there is provided navigation system for a movable body, which comprises map storage means in which map data representative of a map of a predetermined area are stored, position detecting means for detecting a current position of the movable body with respect to the map, a display unit having a screen, map current position display means for causing a map based on map data read out from the map storage means and a current position mark indicative of a detected position of the movable body from the position detecting means to be displayed on the screen of the display unit, partial map display means for reading out part of the map data from the map storage means and causing the displaying means to display a partial map corresponding to the part of the map data on the screen of the display unit, map scrolling means operable in response to a map scrolling instruction signal arbitrarily transmitted thereto for reading out map data corresponding to a region adjacent to the partial map from the map storage means and causing the adjacent region to be displayed on the screen of the display unit to scroll the map on the screen of the display unit and also for moving the current position mark together with the map on the screen, correction position mark displaying means for causing a correction position mark for the current position mark to be displayed substantially at the center of the screen of the display unit after starting of scrolling movement of the map by operation of the map scrolling means, map returning means operable in response to a returning instruction signal arbitrarily transmitted thereto for returning the map and the current position mark scrolled by the map scrolling means to the respective initial positions on the screen of the display unit at which the movable body is present, and current position mark correcting means operable in response to a correcting instruction signal arbitrarily transmitted thereto for moving the scrolled current position mark to the position of the correction position mark with respect to the map scrolled by the map scrolling means.

With the navigation system, if the map scrolling means is operated suitably when an operator wants to see a map contiguous to a map displayed on the screen of the display unit, then the map displayed on the screen can be scrolled suitably together with the current position mark so that the operator may see the desired map. Meanwhile, the correction position mark for the current position mark is displayed additionally substantially at the center of the screen. Then, if the map returning means is operated after the desired map has been observed, the initial map which has been displayed on the screen of the display unit upon starting of the scrolling operation is restored and displayed on the screen and the current position mark is also displayed substantially at the center of the thus restored map. Accordingly, such trouble that the current position of the movable body is missed is eliminated. Further, by operating the current position mark correcting means is operated, then displacement out of position of the current position mark displayed on the map can be compensated for so that the current position on the map and the actual current position of the movable body may coincide correctly with each other.

The above and other objects, features and advantages of the present invention will become apparent from the following description and the appended claims, taken in conjunction with the accompanying drawings.

BRIEF DESCRIPTION OF THE DRAWINGS

FIG. 8 is a flow chart illustrating calculation processing at step S16 of a main routine for the navigation;

FIG. 9 is a flow chart illustrating external interrupt calculation processing based on a distance pulse from a distance sensor of the navigation system of FIG. 1;

FIG. 10 is a flow chart showing a timer interrupt calculation routine based on a distance pulse from the distance sensor and a signal from a direction sensor of the navigation system of FIG. 1;

DESCRIPTION OF THE PREFERRED EMBODIMENT

Figure 1:
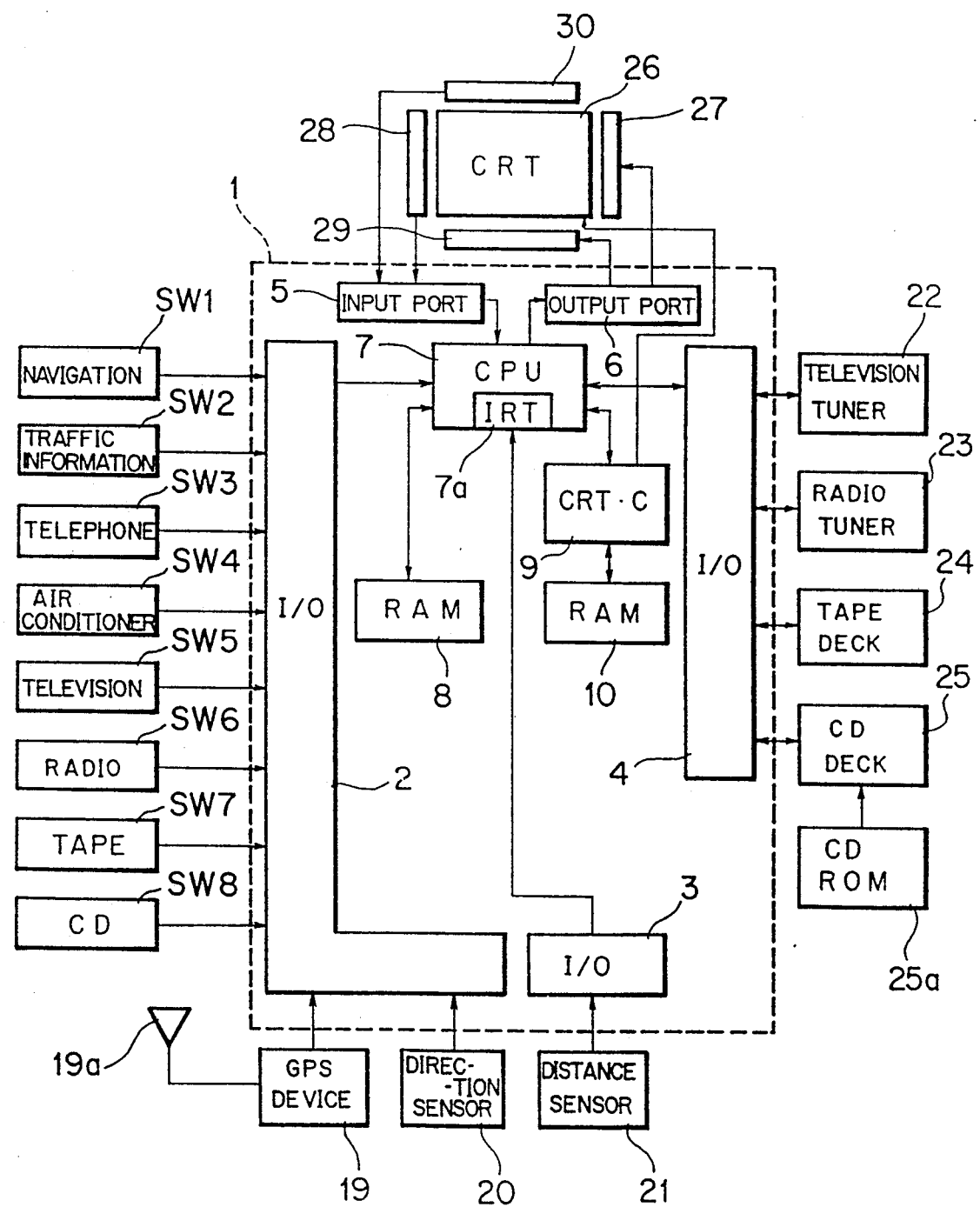
FIG. 1 is a block diagram of a navigation system for a movable body showing a preferred embodiment of the present invention.

Referring first to FIG. 1, there is shown entire construction of a navigation system for a movable body to which the present invention is applied. The navigation system includes a controlling device 1 including three input/output interface circuits 2, 3 and 4, an input port 5, an output port 6, a central processing unit (CPU) 7, a CRT (cathode ray tube) controller 9, and a pair of RAMs (random access memories) 8 and 10. The controlling device 1 operates with stabilized power supplied from a car-carried battery not shown by way of a stabilized power source or constant voltage circuit not shown to control various devices connected to the controlling device 1.

Figure 2:
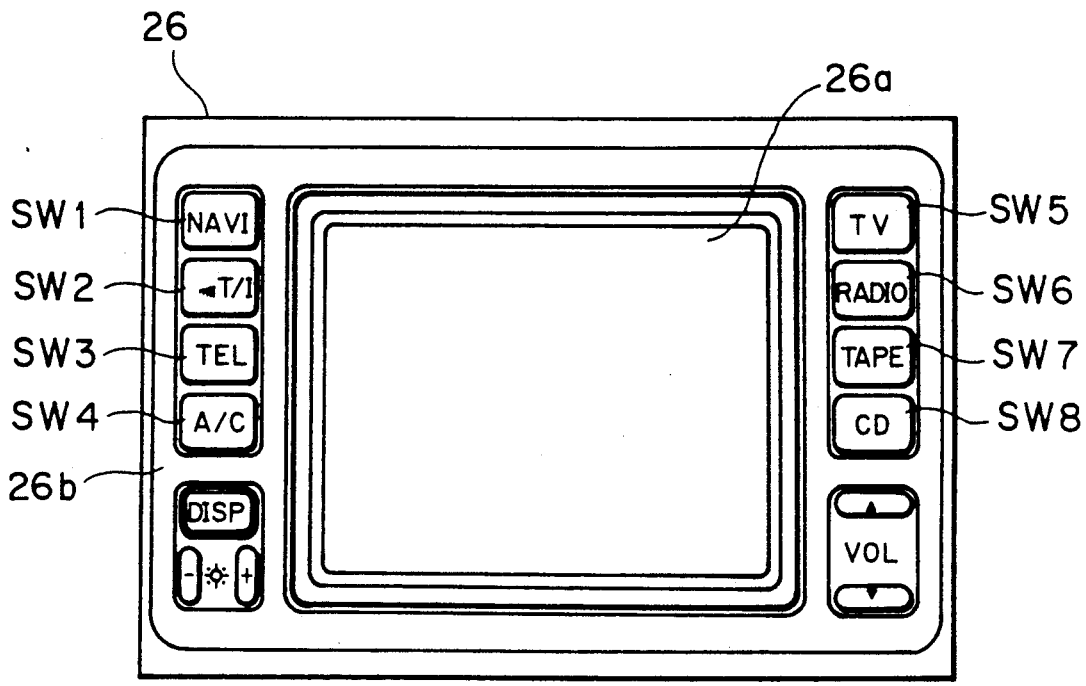
FIG. 2 is a front elevational view of a display unit for use with the navigation system of FIG. 1.

Connected to the first input/output interface circuit 2 are eight function switches including a navigation mode selecting switch SW1 for the navigation of driving of a vehicle, a traffic information mode selecting switch SW2 for receiving traffic information broadcasting, a wireless telephone mode selecting switch SW3 for an automobile telephone, an air conditioner mode selecting switch SW4 for the air conditioning of a room of the vehicle, and video/audio switches for operating video/audio sources including a television switch SW5, a radio switch SW6, a tape player switch SW7 and a compact disk (CD) player switch SW8. The mode function switches SW1 to SW8 are disposed on a front panel 26b of a display unit or cathode ray tube (CRT) 26 as shown in FIG. 2, and when one of the function switches SW1 to SW8 is selectively operated, a corresponding function is rendered operative.

The first input/output interface circuit 2 is further connected to a GPS (satellite navigation) device 19 for receiving radio waves from an artificial satellite by way of an antenna 19a and confirming and determining a current position, a moving speed and so forth of the automobile based on such radio waves received, and a direction sensor 20 for decomposing terrestrial magnetism into a component in an advancing direction of the vehicle and another component in a direction perpendicular to the advancing direction by means of a terrestrial magnetism detector of the flux gate type or the like mounted on the vehicle and outputting a signal corresponding to such components as a vehicle advancing direction $\theta$.

The second input/output interface circuit 3 is connected to a distance sensor 21 for detecting rotation of a wheel of the vehicle by means of an electromagnetic pickup, a lead switch or the like and outputting a pulse signal which increases in proportion to the rotational speed of the wheel. It is to be noted that current position detecting means for obtaining data of a current position of the vehicle and also data of a locus of movement of the vehicle is constituted from the direction sensor 20 and distance sensor 21.

The third input/output interface circuit 4 is connected to video/audio devices such as a television tuner 22, a radio tuner 23, a tape deck 24 and a CD deck 25. A CD ROM (read only memory) 25a serving as map storage means is provided on the CD deck 25, and when the navigation mode selecting switch SW1 is selectively operated, information of various maps, line data and so forth which will be hereinafter described are read out from the CD ROM 25a so that they may be displayed on the CRT 26.

It is to be noted that, as the CD ROM 25a described above, a memory for the storage of map information disclosed in NIKKEI ELECTRONICS, No. 434, Nov. 26, 1987 is adopted, and map information including a map of the whole of a country, maps of districts, maps of regions and maps of areas are stored as vector data in the memory. Further, in the present embodiment, the map information includes three kinds of maps of wide area maps, standard maps and detailed maps having different scales, and such map information for the different kinds of maps is stored such that they may cover a common area.

It is also to be noted that each of the area maps mentioned above is divided into four sections corresponding to the four quadrants of the screen 26a of the CRT 26, and data of such four map blocks which make up a partial map are successively stored as map information in the CD ROM 25a such that four times a map block which is part of the partial block may make a background of the screen 26a. Further, lines interconnecting different points on each area map, for example, lines indicative of roads, rivers, bridges and so forth are stored in a divided condition as line data while character data of characters, symbols and so forth as well as service data of hotels, golf links and so forth as service symbols are also stored in the CD ROM 25a. Then, as regards particular items such as roads, rivers and bridges, they are stored each in the form of a color code representative of a plurality of colors in order to allow display thereof in various colors. Further, in order to allow each of the items in any color other than the color code, the CD ROM 25a has a plurality of memory tables stored therein in the form of color codes for a large number of color pallets. In addition, dot data for shadowing the screen 26a and dot data for shadowing also an area of the screen 26a in which an icon which serves as a touch pattern is displayed are also stored in the CD ROM 25a.

The CPU 7 controls operation of the video/audio devices in response to a selective operation of the function switches SW1 to SW8, reads map information and so forth from the CD ROM 25 and provides a control signal to the CRT 26 to display the thus read map information on the screen 26a of the CRT 26. Further, the CPU 7 receives a pulse signal from the distance sensor 21, a GPS signal from the GPS device 19 and digital signals of X and Y components of a direction from the direction sensor 20 all by way of an interrupt circuit (IRT) 7a, executes calculation processing to find out a current position included in running locus information, and outputs a display signal. Further, a current position is stored after each predetermined interval of time to obtain a driving locus also included in driving locus information.

Figures 3A, 3B, 3C:
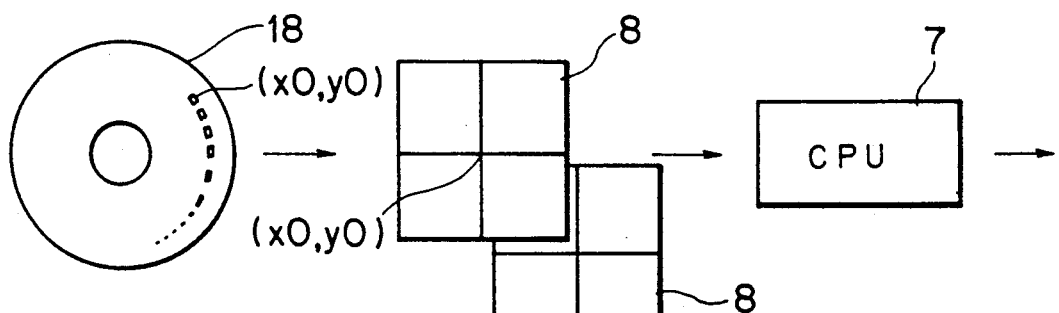
FIGS. 3a to 3e are schematic views illustrating a principle of the present invention.

The RAM 8 serves as temporary storage means and is normally backed up from a car-carried battery so that data read out from the CD ROM 25a shown in FIG. 3a at a step when calculation processing is to be executed by the CPU 7 may be temporarily stored and maintained in the RAM 8 as seen in FIG. 3b. Then, when map information is read out from the RAM 8, also line data are read out as part of such map information, and when a desired map is selected, data are taken out so that various lines may be overlapped with the map. It is to be noted that map information is stored into the RAM 8 such that coordinates (x0, y0) of a current position stored in a first memory table of the CD ROM 25a may coincide with the center of the screen 26a, and if the current position data are read out, then they are displayed as a current position mark M at the center of the screen 26a. Further, the RAM 8 includes a memory table for storing position data in order to allow display of a driving locus on the screen 26a of the CRT 26, and in the present embodiment, the RAM 8 includes a plurality of memory tables forming an endless loop for map information of individual maps of different scales stored in the CD ROM 25a.

The CRT controller 9 serves as information display means and is provided to receive a command for the outputting of a display signal from the CPU 7, develop driving locus information into the display RAM 10 and output a video signal and a synchronization signal for causing map data, character data, driving locus information and so forth stored in the RAM 10 to be displayed on the CRT 26. It is to be noted that the CPU 7 reads out partial map information of such four map blocks as described above stored in the CD ROM 25a and information of one of enlarged, standard and detailed maps also stored in the CD ROM 25a which corresponds to a designated scale and driving locus information corresponding to the map information from a memory table of the RAM 8 and causes a driving locus to be displayed in an overlapping relationship on a line on the map.

Figures 3D, 3E:
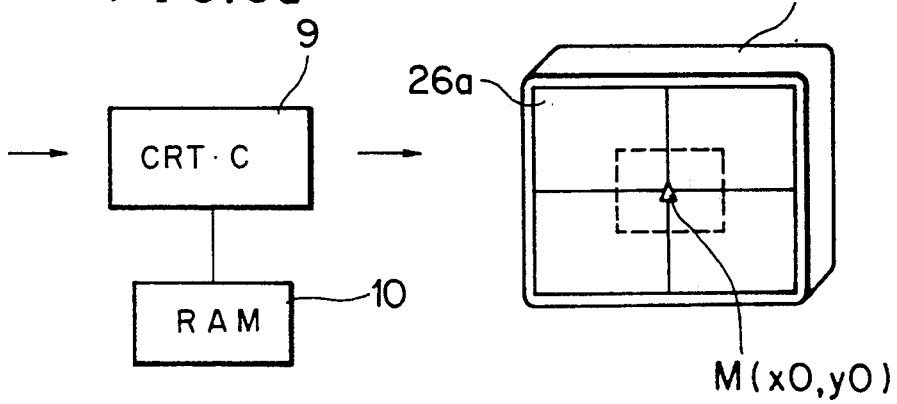

The display RAM 10 has stored therein, in addition to additional information such as a map number, a kind of a scale and so forth, data of patterns which are used to display operation keys for driving such various devices as described above as touch switches on the screen 26a of the CRT 26. The pattern data include data of a current position mark M (refer to FIG. 3e) which is displayed as a triangle on the screen 26a of the CRT 26, a locus display pattern which is a first mode for displaying a driving locus in the form of a plurality of serial dots and a locus non-display pattern which is a second mode for erasing a displayed driving locus from the screen 26a of the CRT 26, and such pattern data are stored as switching means for inputting a switching signal to the CPU 7, that is, as touch switches, in the display RAM 10. The display RAM 10 further has stored therein four scroll key patterns S1 to S4 constituting map scrolling means for arbitrarily scrolling a map displayed on the screen 26a of the CRT 26, a correction position mark MO serving as correction position mark display means for correcting the position of the current position mark M displayed on the screen 26a, a returning pattern R1 serving as map returning means for returning a scrolled map to its initial position, a correction pattern R2 serving as current position mark correcting means for moving, upon movement of the current position mark M, to the position of the correcting position mark MO, and so forth. Further, though not shown, also enlarging and reducing patterns for selecting a scale of a map and so forth are stored in the display RAM 24.

The CRT 26 displays a map of a particular section, a driving locus, a current position and so forth in color thereon in response to a video signal and a synchronization signal from the CRT controller 9. Further, various operation keys of a touch switch section which will be hereinafter described are displayed in a predetermined touch area of the CRT 26, and if the television switch SW5 is depressed to cause the television tuner 22 to be switched on, then a television image can be displayed on the CRT display 26.

A pair of light emitting devices 27 and 29 are connected to the CPU 7 by way of the output port 6 while a pair of light receiving devices 28 and 30 are connected to the CPU 7 by way of the input port 5, and the light emitting and receiving devices 27 to 30 are disposed on an inner frame on a surface of the CRT 26 such that the light emitting devices 27 and 29 are opposed to the light receiving element 28 and 30, respectively, to constitute a touch panel section for touch switches. It is to be noted that the touch panel section is constituted such that, though not shown, it is divided into a large number of touch areas in horizontal and vertical directions, and when a certain one of the touch areas is touched by an operator, infrared rays which are to pass the certain area in horizontal and vertical directions are intercepted to produce a driving signal for providing various instructions. More particularly, if the screen 26a of the CRT 26 is touched by an operator, a suitable operation pattern or patterns are displayed on the screen 26a, and then if one of the patterns is touched, then setting of starting or stopping of operation of a device or setting of a time, a numeric value or the like can be performed correspondingly.

Operation of the navigation system for a movable body having such construction as described above will be described will be described subsequently with reference to flow charts shown in FIGS. 4 and 8 to 10.

Figure 4:
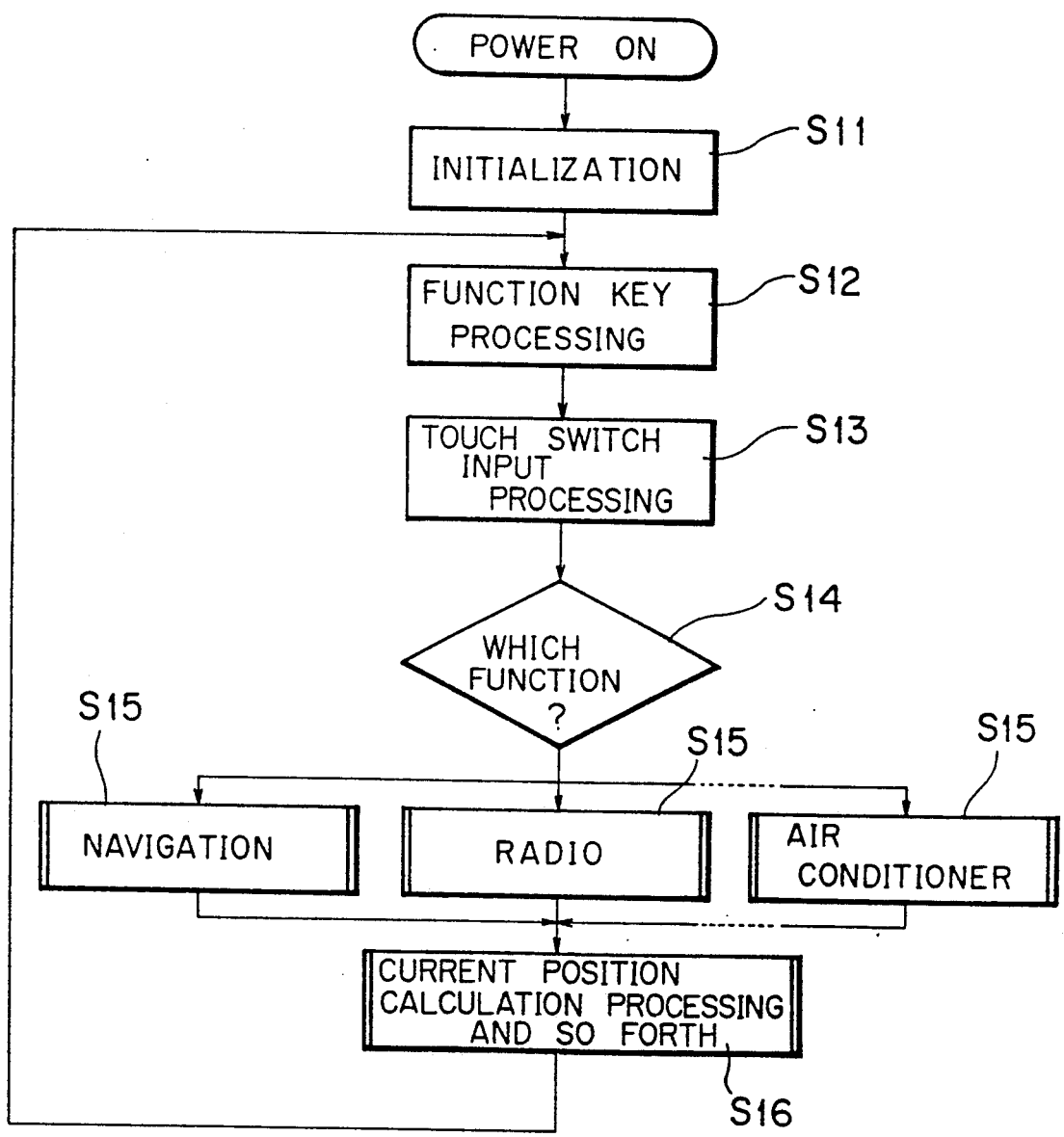
FIG. 4 is a flow chart illustrating calculation processing of a main routine of a controlling section of the navigation system of FIG. 1.
Figure 5:
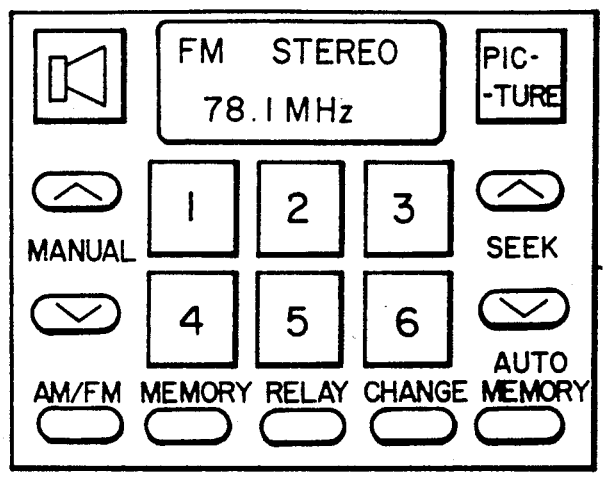
FIGS. 5 to 7 are schematic illustrations showing different menus displayed on a screen of the display unit of FIG. 2.
Figure 6:
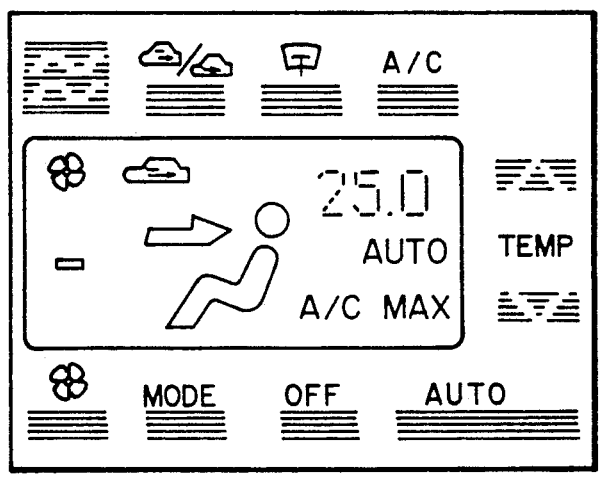

If a key switch not shown of the automobile is turned on in order to start driving of the automobile, electric power is supplied from the car-carried battery not shown so that electric systems of the automobile are rendered operative. Thereupon, also the CPU 7 of the controlling section 1 is rendered operative by way of the stabilized power source and starts its operation in accordance with the flow chart shown in FIG. 4. Referring to FIG. 4, the CPU 7 first initializes itself at step S11 and then repeats calculation processing illustrated in the main routine of FIG. 4 for each period of several tens milliseconds or so. In particular, at step S12, processing of function keys is executed, that is, the switches SW1 to SW8 are accessed, and then at step S13, input processing of touch switches is executed, that is, the light emitting and receiving devices 27 to 30 of the CRT 26 are accessed. Then, if it is judged at step S14 that an operator depresses one of the mode selection switches such as, for example, the radio switch SW6 or air conditioner switch SW4, such a pattern of a radio mode as shown in FIG. 5 or such a pattern of an air conditioner mode as shown in FIG. 6 is displayed, at step S15, on the screen 26a of the CRT 26 in accordance with the depressed mode selection pushbutton. Then, if an area of a switch pattern provided on a display screen of the thus selected mode is touched by the operator, then the selected device is operated in accordance with a desired setting. During the operation of the selected device after such selection by touching of the area, the control sequence advances to step S16 at which the CPU 7 executes calculation processing of a current position and so forth. After then, the control sequence returns to step S12 to repeat such a sequence of operations as described above.

Details of operation at step S16 are illustrated in detail in FIG. 8. Referring now to FIG. 8, first at step S21, a travel distance of the vehicle is detected by the distance sensor 21. Then at step S22, a calculation of a current position is executed, and then at step S23, current position data obtained by such calculation are stored as driving locus data successively into the RAM 8 for the temporary storage.

Accordingly, after the automobile starts its driving, driving locus information such as a travel distance and a driving locus to the current position can be obtained in this manner.

While the calculation processing to find out a current position and so forth of the vehicle as described just above may be executed as at step S16 in the processing of the main routine shown in FIG. 4, preferably the current position of the vehicle is determined periodically at suitable time intervals corresponding to a current speed of the vehicle in order to detect the current position with suitable accuracy. To this end, such calculation processing is executed in interrupt processing.

Referring now to FIG. 9, there is shown an external interrupt routine. In particular, after the automobile is started, a pulse signal is successively developed from the distance sensor 21 and transmitted to the CPU 7 by way of the interrupt circuit 7a. In response to such pulse signal, the routine shown in FIG. 9 is entered. In the routine, at step S31, a pulse count CP is incremented by one by the CPU 7 to obtain a travel distance to the current position. Naturally, the rate of increase of such pulse count CP increases in proportion to the speed of the vehicle.

Then, while the automobile is travelling, another interrupt processing routine shown in the flow chart of FIG. 10 is executed at predetermined time intervals, for example, of 1 second, that is, independently of the speed of the vehicle. Referring to FIG. 10, first at step S41, a pulse count CP obtained at step S31 of the routine of FIG. 9 is accessed. Then at step S42, the pulse count CP then is multiplied by a unit travel distance d, for example, 39.25 cm to find out a travel distance D for the fixed period of time. Then at step S43, direction $\theta$ is read in from the direction sensor 20. Subsequently at step S44, a position of the vehicle on a two dimensional coordinate system is calculated in the following expressions from the direction $\theta$ and the travel distance D calculated at step S42:

$$\Delta x = D \cdot \cos\theta$$

$$\Delta y = D \cdot \sin\theta$$

After then, at step S45, a current position (x, y) of the vehicle is calculated in accordance with the following expressions from the coordinates ($\Delta x$, $\Delta y$) calculated at step S45 and the coordinates (xo, yo) of the starting point:

$$x_{n+1} \leftarrow x_n + \Delta x$$

$$y_{n+1} \leftarrow y_n + \Delta y$$

As a result, the travel distance D to the current position which varies every moment is obtained while a latitude and a longitude are determined after each fixed interval of time to recognize the current position (x, y). It is to be noted that the data of the current position (x, y) are transmitted to and successively stored into the RAM 8 for the temporary storage while successively erasing oldest stored data in the RAM 8 in an endless manner as hereinafter described in detail with reference to FIG. 16. Further, even if driving of the automobile is stopped and the key switch is switched off, data of the current position (x, y) and the travel distance D are maintained in the RAM 8.

Subsequently at step S46, the pulse count CP is cleared to zero. Then at step S47, a GPS signal is received from the GPS device 19 and calculation processing for the execution of GPS processing is executed. As a result, absolute values of a longitude and a latitude are determined for each fixed period of time, for example, for each one second, and accordingly, correction of driving locus information can be achieved.

Figure 7:
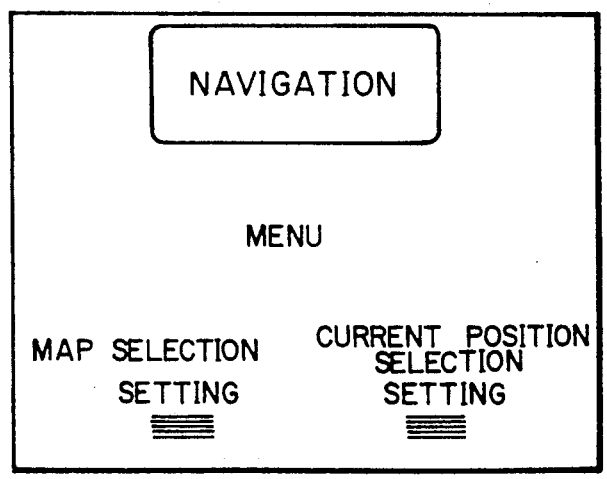
Figure 11:
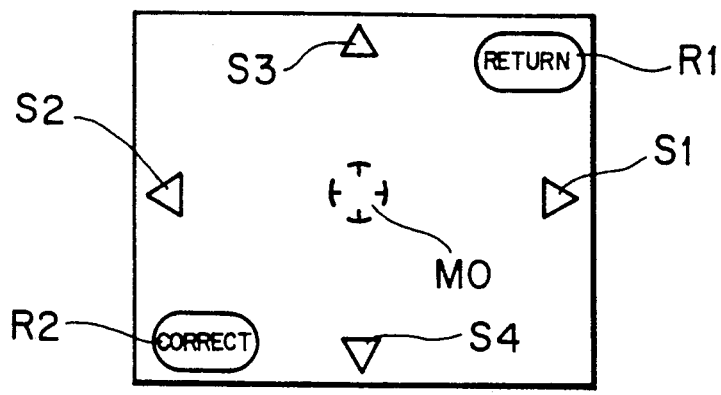
FIG. 11 is a schematic view illustrating function key patterns displayed on the screen of the display unit of FIG. 2.

By the way, when the automobile is to be started, first the navigation mode selecting switch SW1 will be depressed. Consequently, the subroutine at step S15 of the flow chart of FIG. 4 is started. In the navigation subroutine, setting patterns for map selection and a current position are first displayed as a menu on the screen 26a of the CRT 26 as shown in FIG. 7. Then, if the setting pattern for a current position is touched by the operator, then part of detailed map information is read out from the CD ROM 25a and stored into the RAM 8 for the temporary storage while it is also transmitted to the CRT 26. Consequently, four map blocks which make a partial map corresponding to the part of the information are drawn on the screen 26a of the CRT 26 so that a map at a current position is displayed as shown in FIG. 13a. Then, position data are read out from the RAM 8 for the temporary storage and transmitted to the CRT 26, and consequently, a current position mark M is displayed at the center of the screen 26a of the CRT 26. As a result, an operation of moving or scrolling the map and so forth displayed on the screen 26a is enabled, and calculation processing is executed in accordance with the flow chart shown in FIG. 12.

Figure 12:
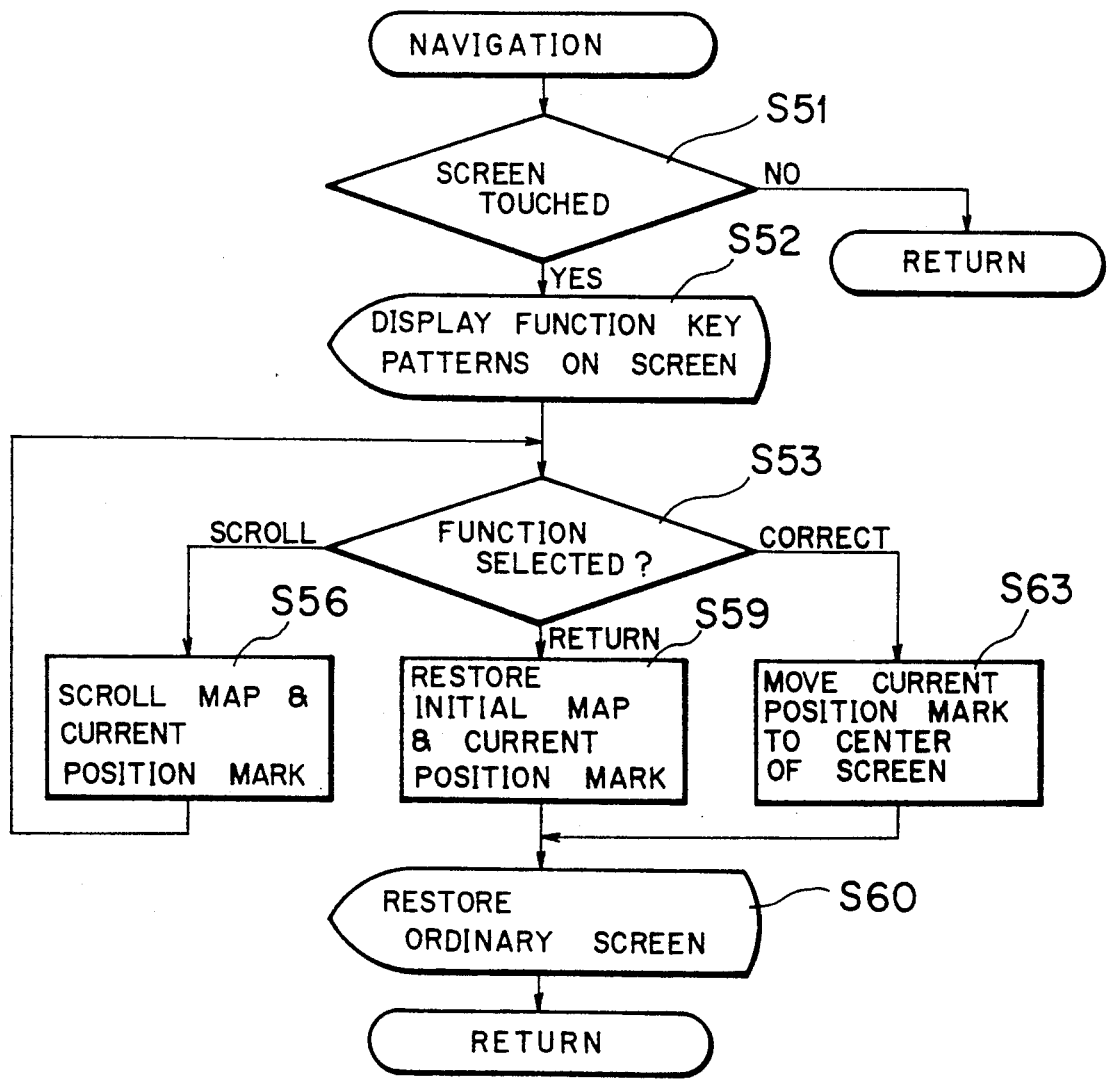
FIG. 12 is a flow chart illustrating detailed calculation processing of a map and a function key pattern to be displayed on the screen of the display unit of FIG. 2.
Figure 13A:
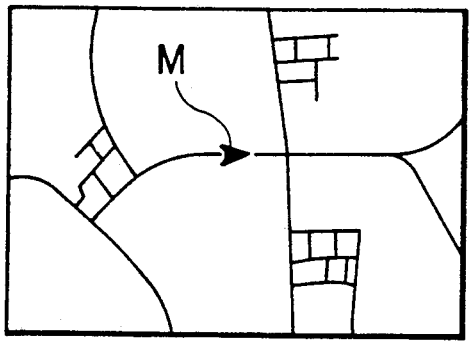
FIGS. 13a to 13e are diagrammatic views illustrating movement of a map and a current position mark displayed on the screen of the display unit of FIG. 2.
Figure 13B:
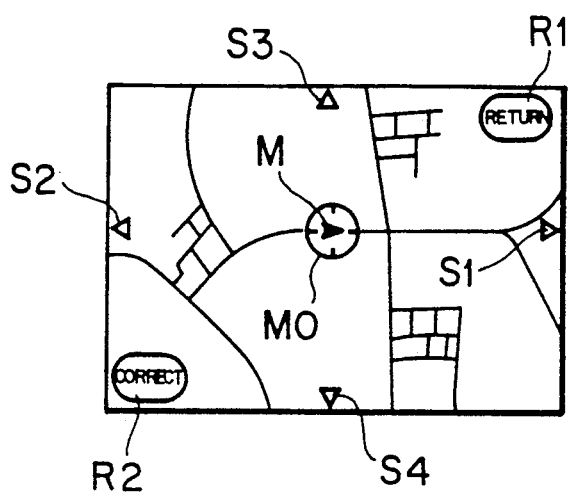

Referring to FIG. 12 which shows part of the navigation subroutine at step S15 of FIG. 4, it is first judged at step S51 whether or not an operator touches any portion of the screen 26a of the CRT 26. In case no touching operation is determined, then the control sequence returns to the original step from which the present subroutine has been entered, that is, to step S15 of FIG. 4, more accurately to next step S16. On the other hand, if a touching operation is determined at step S51, then patterns of the function keys including the scroll keys S1 to S4, correction position mark MO, returing pattern R1 and correction pattern R2 are displayed, at step S52, in an overlapping relationship on the map displayed on the screen 26a as shown in FIG. 13b.

Figure 13C:
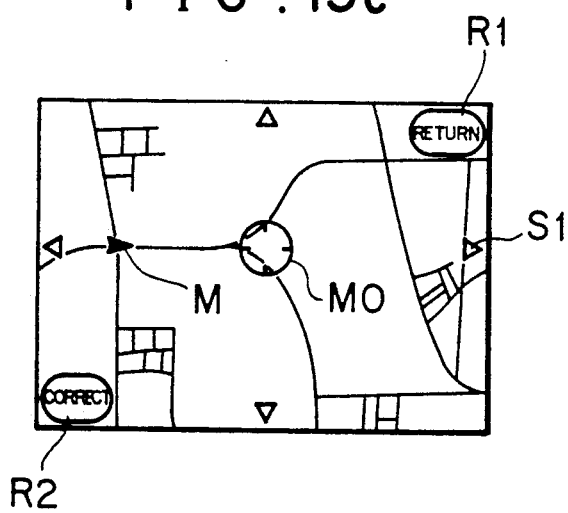

Subsequently, it is waited at step S53 that any one of the functions is selected by touching the pattern of the function key therefor. In particular, when it is intended to see a map forwardly in an advancing direction of the vehicle, the driver will depress the right-hand side scroll key S1 among the four scroll keys S1 to S4 displayed on the screen 26a of the CRT 26 because the vehicle is advancing in the rightward direction on the map displayed on the screen 26a in FIG. 13b. Such depression of the scroll key S1 is discriminated at step S53, and the control sequence thus advances to step S56 at which required map information is read in from the CD ROM 25a. Then at step S56, the map displayed is moved or scrolled leftwardly in FIG. 13b. Meanwhile, position data corresponding to the thus scrolled map are also read out from the RAM 8, and consequently, the current position mark M is moved together with the map as seen in FIG. 13c. After then, the control sequence returns to step S53. Consequently, such scrolling of the map and the current position mark M on the screen 26a of the CRT 26 at step S56 as described just above are repeated while the screen 26a is kept touched by the driver. While such scrolling continues, the current position mark M may not be displayed on the screen 26a of the CRT 26. It is to be noted that, even if the displayed map and the current position mark M are scrolled, the correction position mark MO continues to be displayed at the center of the screen 26a of the CRT 26 in accordance with the pattern data thereof. Then, if the driver stops its touching operation with the scroll key S1, scrolling of the map is stopped and thereafter continues to be displayed on the screen 26a of the CRT 26. Consequently, the driver can visually observe the map the driver wants to see.

When such observation of the map is completed and it is intended to restore the initial map, the operator will selectively touch the returning pattern R1 displayed on the screen 26a of the CRT 26. This is determined at step S53, and consequently, the sequence advances to step S59 at which the initial map which was displayed on the screen 26a upon starting of the scrolling operation is read in from the CD ROM 25a and displayed on the screen 26a while the current position data are also transmitted to the CRT 26 and consequently the current position of the vehicle is displayed with the current position mark M on the thus displayed initial map.

Figure 13D:
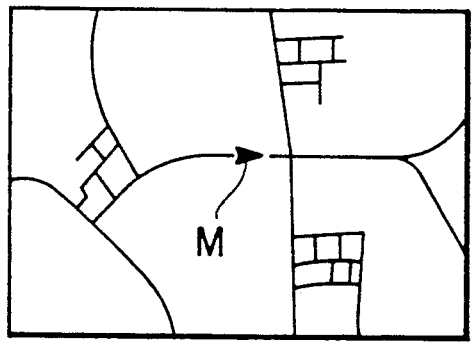

As a result, the mark M indicative of the current position of the vehicle is displayed properly on the map as seen in FIG. 13d. After then, at step S60, the patterns of the function keys are erased and an ordinary screen displaying a map and a current position mark M thereon is restored as seen in FIG. 13d. In this instance, however, the driver will not lose sight of the current position of the vehicle because the current position mark M remains at the predetermined position, that is, substantially at the center of the screen 26a of the CRT 26 as seen in FIG. 13d.

Figure 13E:
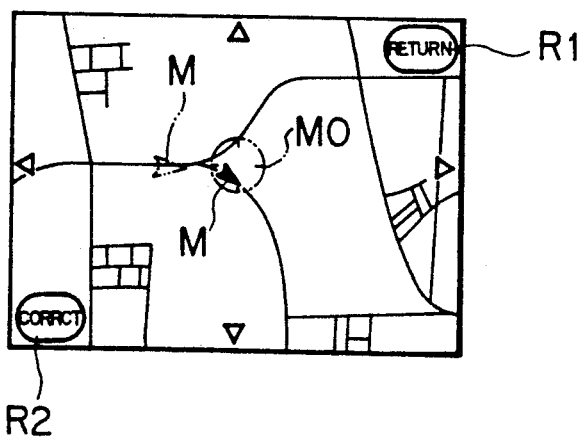

By the way, in case the current position mark M indicative of the current position of the vehicle is displaced out of position as shown in phantom in FIG. 13e on the map displayed on the CRT 26 as described above, the position of the vehicle can be corrected readily by a simple touching operation.

In particular, the driver will touch the correction pattern R2 on such screen as shown in FIG. 13b. In response to such touching operation, the sequence advances to step S63 at which the correction position mark MO displayed at the center of the screen 26a of the CRT 26 is erased and position data are read out from the RAM 8 for the temporary storage and transmitted to the CRT 26. Consequently, the current position mark M is moved to and displayed at the position at which the correction position mark MO has been displayed. After then, the patterns of the function keys are erased to restore an ordinary screen at step S60. In this instance, however, since the current position mark M remains at the center of the screen 26a of the CRT 26, such displacement of the current position mark as described above is now corrected, and consequently, the driver can visually observe the position of the vehicle correctly on the displayed map.

As apparent from the foregoing description, the navigation system for a movable body of the present embodiment includes the scroll keys S1 to S4 for scrolling a map and the current position mark M, the position correction mark MO displayed at the center of the screen 26a of the CRT 26 for correcting the position of the current position park M, the returning mark R1 for returning the scrolled map and current position mark M to their initial conditions before starting of such scrolling, and the correction pattern R2 for moving the current position mark M to the position of the position correction mark M while the map is fixed with respect to the screen 26a. Thus, if any one of the scroll keys S1 to S4 is selectively touched, then a map and the current position mark M displayed on the screen 26a of the CRT 26 are scrolled or moved in a desired direction, and accordingly, a driver can visually observe a map the driver wants to see.

Further, if the returning pattern R1 is touched after observation of the map is completed, then the current position of the vehicle is indicated with the current position mark M on the map displayed on the screen 26a of the CRT 26. Consequently, the current position mark M indicative of the current position of the vehicle is displayed properly on the map, and accordingly, the driver will not miss the current position. Thus, such a problem is eliminated that the driver loses its way at an unknown or unfamiliar location.

On the other hand, when the mark M displayed on the screen 26a of the CRT 26 during driving of the vehicle and indicative of the current position of the vehicle is displaced out of position, if the correction pattern R2 displayed on the screen 26a is touched, the current position mark M is moved to the position of the position correction mark MO. Accordingly, the current position of the vehicle can be displayed correctly on the map indicating the current position.

Having now fully described the invention, it will be apparent to one of ordinary skill in the art that many changes and modifications can be made thereto without departing from the spirit and scope of the invention as set forth herein.

What is claimed is:

1. A navigation system for a movable body, comprising map storage means in which map data representative of a map of a predetermined area are stored, position detecting means for detecting a current position of said movable body with respect to the map, a display unit having a screen, map current position display means for causing a map based on map data read out from said map storage means and a current position mark indicative of a detected position of said movable body from said position detecting means to be displayed on said screen of said display unit, partial map display means for reading out part of the map data from said map storage means and causing said displaying means to display a partial map corresponding to the part of the map data on said screen of said display unit, map scrolling means operable in response to a map scrolling instruction signal arbitrarily transmitted thereto for reading out map data corresponding to a region adjacent to the partial map from said map storage means and causing the adjacent region to be displayed on said screen of said display unit to scroll the map on said screen of said display unit and also for moving said current position mark together with the map on said screen, correction position mark displaying means for causing a correction position mark for the current position mark to be displayed substantially at the center of said screen of said display unit after starting of scrolling movement of the map by operation of said map scrolling means, map returning means operable in response to a returning instruction signal arbitrarily transmitted thereto for returning the map and the current position mark scrolled by said map scrolling means to the respective initial positions on said screen of said display unit at which said movable body is present, and current position mark correcting means operable in response to a correcting instruction signal arbitrarily transmitted thereto for moving the scrolled current position mark to the position of the correction position mark with respect to the map scrolled by said map scrolling means.

* * * * *